(12) United States Patent
Borges et al.

(10) Patent No.: US 12,413,951 B2
(45) Date of Patent: Sep. 9, 2025

(54) DISCOVERY FOR NEIGHBOR AWARENESS NETWORKING

(71) Applicant: Apple Inc., Cupertino, CA (US)

(72) Inventors: Daniel R. Borges, San Francisco, CA (US); Lochan Verma, Danville, CA (US); Su Khiong Yong, Palo Alto, CA (US); Yong Liu, Campbell, CA (US)

(73) Assignee: APPLE INC., Cupertino, CA (US)

( * ) Notice: Subject to any disclaimer, the term of this patent is extended or adjusted under 35 U.S.C. 154(b) by 369 days.

(21) Appl. No.: 17/807,498

(22) Filed: Jun. 17, 2022

(65) Prior Publication Data

US 2023/0033043 A1 Feb. 2, 2023

Related U.S. Application Data

(60) Provisional application No. 63/225,166, filed on Jul. 23, 2021.

(51) Int. Cl.
*H04W 8/00* (2009.01)
*H04W 48/10* (2009.01)
*H04W 48/16* (2009.01)
*H04W 84/12* (2009.01)

(52) U.S. Cl.
CPC .......... *H04W 8/005* (2013.01); *H04W 48/10* (2013.01); *H04W 48/16* (2013.01); *H04W 84/12* (2013.01)

(58) Field of Classification Search
CPC ..... H04W 8/005; H04W 48/10; H04W 48/16; H04W 84/12
See application file for complete search history.

(56) References Cited

U.S. PATENT DOCUMENTS

2017/0317938 A1* 11/2017 Abraham .......... H04W 52/0212

OTHER PUBLICATIONS

Wi-Fi Alliance, "Wi-Fi Aware™ Specification," Version 3.2, Oct. 23, 2020; 214 pages.

* cited by examiner

*Primary Examiner* — Ji-Hae Yea
(74) *Attorney, Agent, or Firm* — STERNE, KESSLER, GOLDSTEIN & FOX P.L.L.C.

(57) ABSTRACT

Some aspects of this disclosure are directed to implementing a discovery procedure including one or more of single channel publish phases, multi-channel publish phases, and single channel subscribe phases. For example, a method includes determining, by a publisher device, a first time period for a single channel publish phase and determining, by the publisher device, a second time period for a multi-channel publish phase. The method further includes transmitting, by the publisher device, one or more frames during at least one of the first time period of the single channel publish phase or the second time period of the multi-channel publish phase. The method further includes receiving, by the publisher device, a service specific message from a subscriber device during the at least one of the first time period of the single channel publish phase or the second time period of the multi-channel publish phase.

20 Claims, 11 Drawing Sheets

Service Info field format ~531

| OUI |
|---|
| Service Protocol Type |
| Service Specific Info |

*FIG. 5C*

Service Control field format ~511

| Publish Subscribe Follow-up | Matching Filter Present | Service Response Filter Present | Service Info Present | Discovery Range Limited | Binding Bitmap | Reserved |
|---|---|---|---|---|---|---|

*FIG. 5B*

DISCOVERY FOR NEIGHBOR AWARENESS NETWORKING

CROSS-REFERENCE TO RELATED APPLICATIONS

The present application claims the benefit of U.S. Provisional Patent Application No. 63/225,166, filed on Jul. 23, 2021, which is hereby incorporated by reference in its entirety.

BACKGROUND

Field

The described aspects generally relate to discovery procedures for Neighbor Awareness Networking (NAN).

Related Art

Neighbor Awareness Networking (NAN) or Wi-Fi Aware™ enables electronic devices to discover each other and directly connect to each other without any other connections between them. In some examples, NAN enables electronic devices to use their wireless local area network (WLAN) transceivers (e.g., Wi-Fi™ transceivers) to directly connect to each other. The electronic devices can use NAN to create or join a cluster of electronic devices (e.g., NAN clusters). In some examples, the electronic devices (e.g., the NAN devices) are required to establish timing synchronization between them during their discovery procedure, which can take a long period of time and can consume more power. Additionally, a NAN device may lose its connectivity to other devices when the NAN device is in the process of discovering other NAN devices.

SUMMARY

Some aspects of this disclosure include apparatuses and methods for implementing a discovery procedure including one or more of single channel publish phases, multi-channel publish phases, and single channel subscribe phases. For example, some aspects of this disclosure are directed to a publisher device recursively iterating between a single channel publish phase and a multi-channel publish phase to discover one or more subscriber devices until the discover procedure is terminated. Additionally, some aspects of this disclosure are directed to a subscriber device performing the discovery procedure in a single channel subscribe phase to discover one or more publisher devices.

Some aspects of this disclosure relate to an electronic device. The electronic device includes a transceiver configured to communicate with a second electronic device and a processor communicatively coupled to the transceiver. The processor is configured to determine a first time period for a single channel publish phase and determine a second time period for a multi-channel publish phase. The processor is further configured to transmit, using the transceiver, one or more frames during at least one of the first time period of the single channel publish phase or the second time period of the multi-channel publish phase. The processor is further configured to receive, using the transceiver, a service specific message from the second electronic device during the at least one of the first time period of the single channel publish phase or the second time period of the multi-channel publish phase.

Some aspects of this disclosure relate to a method that includes determining, by a publisher device, a first time period for a single channel publish phase and determining, by the publisher device, a second time period for a multi-channel publish phase. The method further includes transmitting, by the publisher device, one or more frames during at least one of the first time period of the single channel publish phase or the second time period of the multi-channel publish phase. The method further includes receiving, by the publisher device, a service specific message from a subscriber device during the at least one of the first time period of the single channel publish phase or the second time period of the multi-channel publish phase.

Some aspects of the disclosure relate to a non-transitory computer-readable medium storing instructions that, when executed by a processor of a publisher device, cause the processor to perform operations including determining a first time period for a single channel publish phase and determining a second time period for a multi-channel publish phase. The operations further include transmitting one or more frames during at least one of the first time period of the single channel publish phase or the second time period of the multi-channel publish phase. The operations further include receiving, by the publisher device, a service specific message from a subscriber device during the at least one of the first time period of the single channel publish phase or the second time period of the multi-channel publish phase.

Some aspects of this disclosure relate to an electronic device. The electronic device includes a transceiver configured to communicate with a second electronic device and a processor communicatively coupled to the transceiver. The processor is configured to determine a time period for a single channel subscribe phase and determine a channel for the single channel subscribe phase. The processor is further configured to send, using the transceiver, a service specific message to the second electronic device in response to receiving one or more frames from the second electronic device on the channel for the single channel subscribe phase and during the time period for the single channel subscribe phase.

Some aspects of this disclosure are related to a method including determine, by a subscriber device, a time period for a single channel subscribe phase and determining, by the subscriber device a channel for the single channel subscribe phase. The method further includes transmitting a service specific message to a publisher device in response to receiving one or more frames from the publisher device on the channel for the single channel subscribe phase and during the time period for the single channel subscribe phase.

Some aspects of the disclosure relate to a non-transitory computer-readable medium storing instructions that, when executed by a processor of a subscriber device, cause the processor to perform operations including determining a time period for a single channel subscribe phase and determining a channel for the single channel subscribe phase. The operations further include transmitting a service specific message to a publisher device in response to receiving one or more frames from the publisher device on the channel for the single channel subscribe phase and during the time period for the single channel subscribe phase.

This Summary is provided for purposes of illustrating some aspects to provide an understanding of the subject matter described herein. Accordingly, the above-described features are only examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 5A-5C illustrate an example frame format for a Neighbor Awareness Networking Service Discovery Frame (NAN SDF), according to some aspects of the disclosure.

Figure 1:
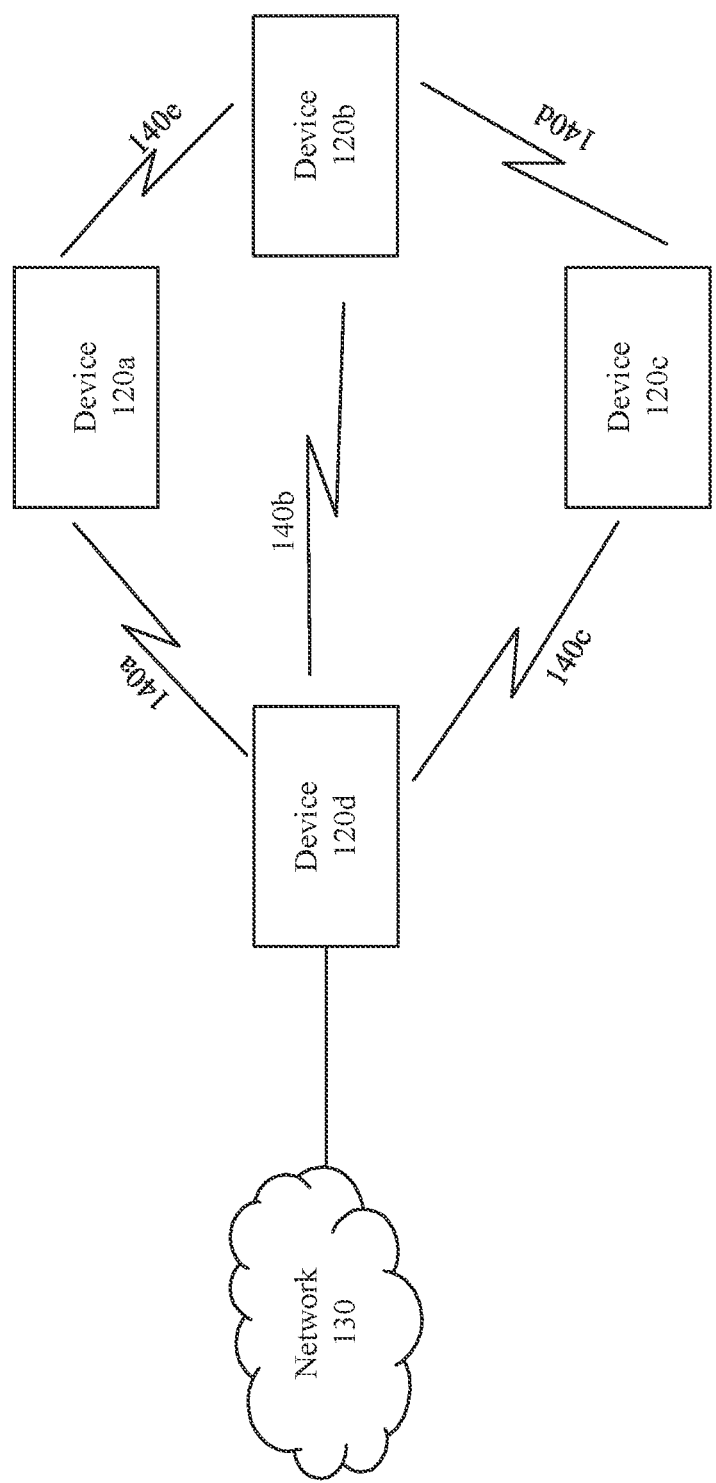
FIG. 1 illustrates an example system implementing a discovery procedure including one or more of single channel publish phases, multi-channel publish phases, and single channel subscribe phases, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing a discovery procedure including one or more of single channel publish phases, multi-channel publish phases, and single channel subscribe phases. For example, some aspects of this disclosure include enhanced discovery procedures in Neighbor Awareness Networking (NAN) for a first electronic device (e.g., a NAN device) to find other devices (e.g., other NAN devices) quickly without requiring the devices to establish timing synchronization between themselves. The discovery procedure of this disclosure is performed without any association between the devices that are performing the discovery procedure, according to some aspects.

According to some aspects, the enhanced discovery procedures of this disclosure can be implemented with communication techniques compatible with Institute of Electrical and Electronics Engineers (IEEE) 802.11 standards (such as, but not limited to IEEE 802.11ac, IEEE 802.11ax, IEEE 802.11bc, IEEE 802.11bd, IEEE 802.11be, Wi-Fi™ Alliance Wi-Fi Aware™ specification, IEEE 802.11 Public Action Frame, etc.). For example, the enhanced discovery procedures of this disclosure can be used within a wireless local area network (WLAN).

FIG. 1 illustrates an example system 100 implementing a discovery procedure including one or more of single channel publish phases, multi-channel publish phases, and single channel subscribe phases, according to some aspects of the disclosure. Example system 100 is provided for the purpose of illustration only and does not limit the disclosed aspects. System 100 may include, but is not limited to, devices 120 and network 130. Devices 120a-120d may include, but are not limited to, Wireless Local Area Network (WLAN) stations such as wireless communication devices, smart phones, laptops, desktops, tablets, personal assistants, monitors, televisions, wearable devices (e.g., smart watches), Internet-of-Things (IoT) devices, and the like. One or more of devices 120a-120d can include an access point (AP). The AP may include, but is not limited to, WLAN electronic devices such as a wireless router, a wearable device (e.g., a smart watch), a wireless communication device (e.g., a smart phone), or a combination thereof. According to some aspects, device 120a-120d can include NAN devices.

Network 130 may be the Internet and/or a WLAN. Device 120's communications are shown as wireless communications 140. The communication between devices 120 can take place using wireless communications 140a-140e. The wireless communications 140a-140e can be based on a wide variety of wireless communication techniques. These techniques can include, but are not limited to, techniques based on IEEE 802.11 (such as, but not limited to, IEEE 802.11ac, IEEE 802.11ax, IEEE 802.11bc, IEEE 802.11bd, IEEE 802.11be, IEEE 802.11v, Wi-Fi™ Alliance Wi-Fi Aware™ specification, IEEE 802.11 Public Action Frame, etc.).

It is noted that although some aspects are discussed with respect to some examples of WLAN (e.g., using NAN), the aspects of this disclosure are not limited to these examples of WLAN and can be used by other WLAN topologies such as, but not limited to, infrastructure network, peer-to-peer network, mesh network, and the like. Also, some aspects of this disclosure are discussed with respect to the communication between non-AP devices and/or the communication between an AP and a non-AP device. However, the aspects of this disclosure can be applied to the communications between any devices (AP and/or non-AP devices).

According to some aspects, devices 120 are configured to implement the enhanced discovery procedure. For example, devices 120 are configured to implement a discovery procedure including one or more of single channel publish phases, one or more of multi-channel publish phases, and/or one or more of single channel subscribe phases, according to some aspects of the disclosure. According to some aspects, device 120a can be a device that is being set up within system 100. In a non-limiting example, device 120a can be an IoT device added to system 100 and is to be set up by, for example, device 120b and/or device 120d. In this non-limiting example, device 120a and device 120b perform the enhanced discovery procedure to discover each other and connect to each other such that device 120b can be used to set up device 120a.

In this example, device 120a (e.g., the device being set up) is a publisher device during the discovery procedure. According to some aspects, device 120a can create a publish instance for both solicited and unsolicited transmission of NAN Service Discovery Frame (NAN SDF) publish, as discussed in more detail below. In this example, device 120b (e.g., the device that is setting the publisher device 120a) can be a subscriber device during the discovery procedure. According to some aspects, device 120b can create a subscribe instance for transmissions of a NAN SDF subscribe frame, as discussed in more detail below. In some examples, device 120b can create an active or a passive mode subscribe instance. In an active mode subscribe instance, device 120b transmits the NAN SDF subscribe frame, according to some aspects. In a passive mode subscribe instance, device 120b does not transmit the NAN SDF subscribe frame, according to some aspects.

According to some aspects, device 120a (e.g., the publisher device), during the discovery procedure, begins operations in a single channel publish phase. Device 120a recursively iterates between the single channel publish phase and a multi-channel publish phase until the discovery procedure is terminated. In some examples, device 120a can begin its discovery procedure when device 120a is triggered for its discovery procedure. For example, device 120a receives a discovery trigger signal to initiate the discovery procedure. In a non-limiting example, the discovery trigger signal can include interacting with a button on an IoT device to trigger the IoT device's set up. However, the aspects of this disclosure are not limited to this example, and the discovery trigger signal can include any other signals or operations to cause device 120a to initiate its discovery procedure.

According to some aspects, during each single channel publish phase, device 120a stays on a single channel (e.g., a default publish channel) for a time period (e.g., a dwell time period). According to some aspects, the time period for the single channel publish phase is determined randomly or pseudo-randomly from a range of time periods. For example, the time period of the single channel publish phase can be N*100 TU (e.g., 1 TU=1024 µs), where N is a random integer within a range between a minimum value and a maximum value. In a non-limiting example, the minimum value can be 4 and the maximum value can be 10. However, the aspects of this disclosure are not limited to these examples, and the minimum value and the maximum value can have other values. According to some aspects, device 120a is configured to determine the time period for each one of the single channel publish phases, e.g., before each single channel publish phase or at the initiation of the discovery procedure. Therefore, the time periods for the single channel publish phases can be different from each other. Alternatively, device 120a can determine one time period (randomly or pseudo-randomly as discussed above) for all of its single channel publish phases. Also, the channel used by device 120a for all single channel publish phases can be the same (e.g., a default publish channel). Alternatively, device 120a can use different channels for different single channel publish phases.

After the time period for the single channel publish phase has ended and device 120a has not received a setup message (e.g., an NAN SDF follow-up frame containing service specific information about setup) from device 120b, the discovery procedure can move to multi-channel publish phase. In other words, each single channel publish phase is followed by a multi-channel publish phase, and the multi-channel publish phase is followed by another single channel publish phase. According to some aspects, at the multi-channel publish phase, device 120a can stay on one or more channels in a publish channel list for a time period (e.g., a dwell time period). According to some aspects, the time period for the multi-channel publish phase is determined randomly or pseudo-randomly from a range of time periods. For example, the time period of the multi-channel publish phase can be M*100 TU (time unit), where M is a random integer within a range between a minimum value and a maximum value. In a non-limiting example, the minimum value be can 4 and the maximum value can be 10. However, the aspects of this disclosure are not limited to these examples, and the minimum value and the maximum value can have other values. The range of time periods for the multi-channel publish phase can be the same or different from the range of time periods for the single channel publish phase.

According to some aspects, device 120a is configured to determine the time period for each of the multi-channel publish phases, e.g., before each multi-channel publish phase or at the initiation of the discovery procedure. Therefore, the time periods for the multi-channel publish phases can be different from each other. Alternatively, device 120a can determine one time period (randomly or at least pseudo-randomly as discussed above) for all of its multi-channel publish phases.

According to some aspects, device 120a can choose one or more channels from the publish channel list for the multi-channel publish phase. In some examples, device 120a can use different channels during different multi-channel publish phases. Additionally, or alternatively, device 120a can choose the same one or more channels for one or more of the multi-channel publish phases. According to some aspects, device 120a can determine to divide the time period of the multi-channel publish phase between the one or more channels that device 120a uses from the publish channel list. In a non-limiting example, device 120a can equally divide the time period between different channels. However, the aspects of this disclosure are not limited to this example and device 120a can use other strategies to divide the time that device 120a stays on each of the one or more channels.

According to some aspects, the randomness in the time spent in each single channel phase and multi-channel phase can avoid a case where the publisher device (e.g., device 120a) and the subscriber device (e.g., device 120b) are in lock-step (e.g., change concurrently) and thus will not find each other. Device 120a iterates between the single channel publish phase and multi-channel publish phase on expiry of the respective time periods (e.g., dwell time periods).

According to some aspects, device 120a can send one or more broadcast NAN SDF publish frames when in the single channel publish phase and when in the multi-channel publish phase. Additionally, or alternatively, device 120a can respond with a unicast NAN SDF publish frame when device 120a receives a NAN SDF subscribe frame with a matching service identifier. According to some aspects, the NAN SDF publish frame can include device and/or service information associated with device 120a. In some examples, a minimum time interval between two NAN SDF frames can be configured by the service information. An exemplary behavior of device 120a (e.g., the publisher device) is further discussed below with respect to FIG. 2.

During the discovery procedure, the subscriber device can be in a single channel subscribe phase. According to some examples, the behavior of the subscriber device is discussed below with respect to a non-AP device (e.g., device 120b) and an AP (e.g., device 120d). According to some examples, the duration of each single channel subscribe phase can be implementation dependent. Also, how often the subscriber devices iterate over the single channel subscribe phase until the discovery procedure is terminated can be implementation dependent. In some examples, the single channel subscribe phase can be run as a background process in the subscriber device without termination. According to some examples, the channel selected by the subscriber device for the single channel subscribe phase can be implementation dependent and can be chosen at the beginning of the discovery procedure and can remain the same until the discovery procedure is terminated. According to some aspects, the channel can be chosen from the publish channel list discussed above. Additionally, or alternatively, the channel for the single channel subscribe phase can be the default publish channel of the single channel publish phase.

As one example, consider device 120b (e.g., a non-AP device) as the subscriber device. In this example, device 120b can be connected to and communicate with device 120c on a first channel. In this example, and during the time that device 120b is not communicating with device 120c, device 120b can implement its discovery procedure using the single channel subscribe phase to discover device 120a. In some implementations, device 120b can use the first channel for its discovery single channel subscribe phase. Alternatively, device 120b can use a second channel (different than the first channel) for its discovery single channel subscribe phase. In some examples, the time period that device 120b uses to stay on the single channel subscribe phase (e.g., dwell time period) can be dependent on a time period that device 120b is not communicating with device 120c. In other words, device 120b (e.g., the non-AP device) can time-share its WLAN transceiver (e.g., Wi-Fi™ radio) for the discovery procedure and for device 120b's other operations (e.g., communicating with device 120c).

In other implementations, device 120d (e.g., an AP) can be the subscriber device. In such implementations, device 120d can be connected to and communicate with device 120c on a first channel. Device 120d can implement its discovery procedure using the single channel subscribe phase to discover device 120a. Device 120d can use the first channel (e.g., the channel device 120d is using for its operations) for its discovery single channel subscribe phase. In some examples, the time period that device 120d uses for the single channel subscribe phase (e.g., dwell time period) can be unlimited. In other words, device 120b can run its discovery procedure using the single channel subscribe phase on the first channel as a background process. Device 120d can be connected to and communicate with device 120c on the first channel in parallel to the single channel subscribe phase on the first channel. According to some aspects, device 120d, during the single channel subscribe phase, listens for the NAN SDF publish frame and may transmit the NAN SDF subscribe frame. Both of these operations and communication between device 120d and device 120c involve receiving and/or transmitting WLAN packets (e.g., packets based on IEEE 802.11) over the air.

According to some aspects, when in a single channel subscribe phase, the subscriber device (e.g., device 120b or device 120d) may send one or more broadcast NAN SDF subscribe frame. The NAN SDF subscribe frame can contain the service information. A minimum time interval between two NAN SDF subscribe frames can be configured by the service information. An exemplary behavior of device 120b (e.g., the publisher device) is further discussed below with respect to FIG. 3.

According to some aspects, the publisher and subscriber devices are configured to perform the discovery procedure using their WLAN transceivers and without any association between the publisher and subscriber devices (e.g., in unassociated state).

After the publisher device and the subscriber device have discovered each other, the subscriber device can set up the publisher device, according to some examples. Additionally, or alternatively, the publisher device can connect to a WLAN associated with the subscriber device, according to some examples.

Figure 2:
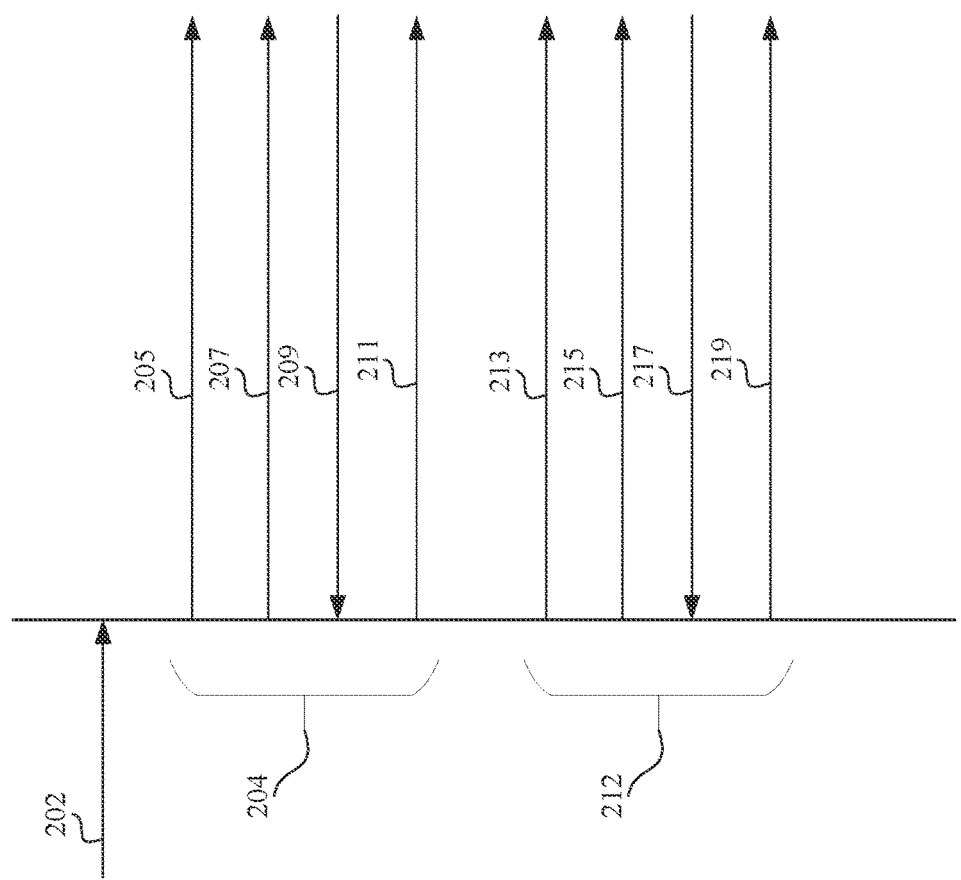
FIG. 2 illustrates an example operation of a publisher device during the discovery procedure, according to some aspects of the disclosure.

FIG. 2 illustrates an example operation 200 of a publisher device during the discovery procedure, according to some aspects of the disclosure. The publisher device 201 (e.g., device 120a of FIG. 1) can receive a discovery trigger signal 202. After receiving the discovery trigger signal 202, the publisher device 201 can initiate its discovery procedure. According to some examples, the discovery procedure can include one or more single channel publish phases 204 and one or more multi-channel publish phases 212. The publisher device 201 can recursively iterate between the single channel publish phase 204 and the multi-channel publish phase 212.

According to some aspects, before beginning the discovery procedure and/or before each of the single channel publish phase(s) 204 and multi-channel publish phase(s) 212, the publisher device 201 can determine a time period for each of the single channel publish phase(s) 204 and the multi-channel publish phase(s) 212. For example, the publisher device 201 can determine a first time period for the single channel publish phase 204 and a second time period for the multi-channel publish phase 212. As discussed above, the time periods are determined randomly from, for example, a range of time periods, according to some aspects. The time period indicates the duration of each of the single channel publish phase(s) 204 and multi-channel publish phase(s) 212. In other words, the time period indicates how long the publisher device 201 will spend in each of the single channel publish phase(s) 204 and multi-channel publish phase(s) 212.

According to some aspects, before beginning the discovery procedure and/or before each of the single channel publish phase(s) 204, the publisher device 201 can determine the channel to be used for discovery during the single channel publish phase 204. In some examples, the channel can be a default publish channel predetermined by a service and/or the discovery procedure. According to some examples, through the single channel publish phase 204, the publisher device 201 is publishing on the default publish channel with a higher probability compared to other channels in the publish channel list. Therefore, a subscriber device (not shown) that is capable of tuning its transceiver (e.g., a WLAN transceiver such as a Wi-Fi™ radio) to the default publish channel can do so, e.g., responsive to receiving the trigger for discovery, and rendezvous with the publisher device 201.

According to some aspects, during the time period determined for the single channel publish phase 204, the publisher device 201 can transmit one or more frames 205, 207, and 211. According to some examples, the one or more of frames 205, 207, and 211 can include one or more broadcast or unicast Neighbor Awareness Networking Service Discovery Frame (NAN SDF) publish frame. The NAN SDF publish frame (e.g., a broadcast transmission) can include information such as, but not limited to, service(s) supported by the publisher device 201 (e.g., service identifier (ID), service information, and the like), vendor information associated with the publisher device 201, product information associated with the publisher device 201, category information, etc. In some aspects, the NAN SDF publish frame can be sent as a unicast message (e.g., a solicited NAN SDF publish frame). The unicast NAN SDF publish frame can be a response message to a broadcast NAN SDF subscribe frame from a subscriber device, according to some examples. The publisher device 201 can receive one or more frames 209 from a subscriber device (not shown). The one or more frame(s) 209 can include a NSN SDF subscribe frame. The NAN SDF subscribe frame (e.g., a broadcast transmission) can include information such as, but not limited to, service(s) supported by the subscriber device (e.g., service ID).

If the discovery procedure is not terminated, the publisher device 201 can transition to a multi-channel publish phase 212 after the time period for the single channel publish phase 204 has expired. According to some aspects, before beginning the discovery procedure and/or before each of the multi-channel publish phase(s) 212, the publisher device 201 can determine one or more channels to use for discovery during the multi-channel publish phase 212. In some examples, the publisher device 201 can choose the one or more channels from the publish channel list. Publisher device 201 can use the one or more channels to transmit one or more frames. Through the multi-channel publish phase 212, the publisher device 201 can publish on any/all of the channels in the publish channel list. A subscriber device (e.g., an AP) may be unable to tune its transceiver to the default publish channel because of WLAN connectivity operation on another channel, according to some aspects. Through multi-channel publish phase 212, such subscriber devices, in response to receiving the trigger for discovery, can rendezvous with the publisher.

According to some aspects, during the time period determined for the multi-channel publish phase 212, the publisher device 201 can transmit one or more frames, e.g., frames 213 and 215, on the one or more channels selected from the publish channel list. According to some examples, the one or more of frames 213 and 215 can include one or more broadcast or unicast NAN SDF publish frames. Additionally, or alternatively, the publisher device 201 can receive one or more frames (e.g., a NAN SDF subscribe frame) from a subscriber device (not shown).

If the discovery procedure is not terminated, the publisher device 201 can move to a single channel publish phase 204 after the time period for the multi-channel publish phase 212 has expired.

According to some aspects, the discovery procedure can be terminated after a termination time (e.g., a time out). In some implementations, the publisher device 201 can determine the amount of time it iterates between the single channel publish phase 204 and the multi-channel publish phase 212. If the determined amount of time is equal to or greater than a threshold (e.g., the termination time), then the publisher device 201 can terminate the discovery procedure.

Additionally, or alternatively, the subscriber device (not shown), after discovering the publisher of interest (e.g., publisher device 201), can initiate exchange of one or more service specific messages with the publisher device 201. The one or more service specific messages be carried in the NAN SDF follow-up frame, according to some aspects. The commencement of exchange of service specific messages can terminate the discovery procedure. In some examples, one or more frames 217 and 219 can include the service specific messages between the subscriber device (not shown) and the publisher device 201. After the exchange of service specific messages 217 and 219, the publisher device 201 can terminate the discovery procedure, according to some aspects. In some examples, frame 217 can include NAN SDF follow-up frame sent by the subscriber device. In this example, the subscriber device, after receiving a NAN SDF publish frame (e.g., frame 215) containing the service ID of interest, sends a NAN SDF follow-up frame to the publisher device 201. Frame 217 (e.g., the NAN SDF follow-up) contains a service specific message for setup. According to some aspects, the NAN SDF follow-up frame is a unicast message.

Figure 3:
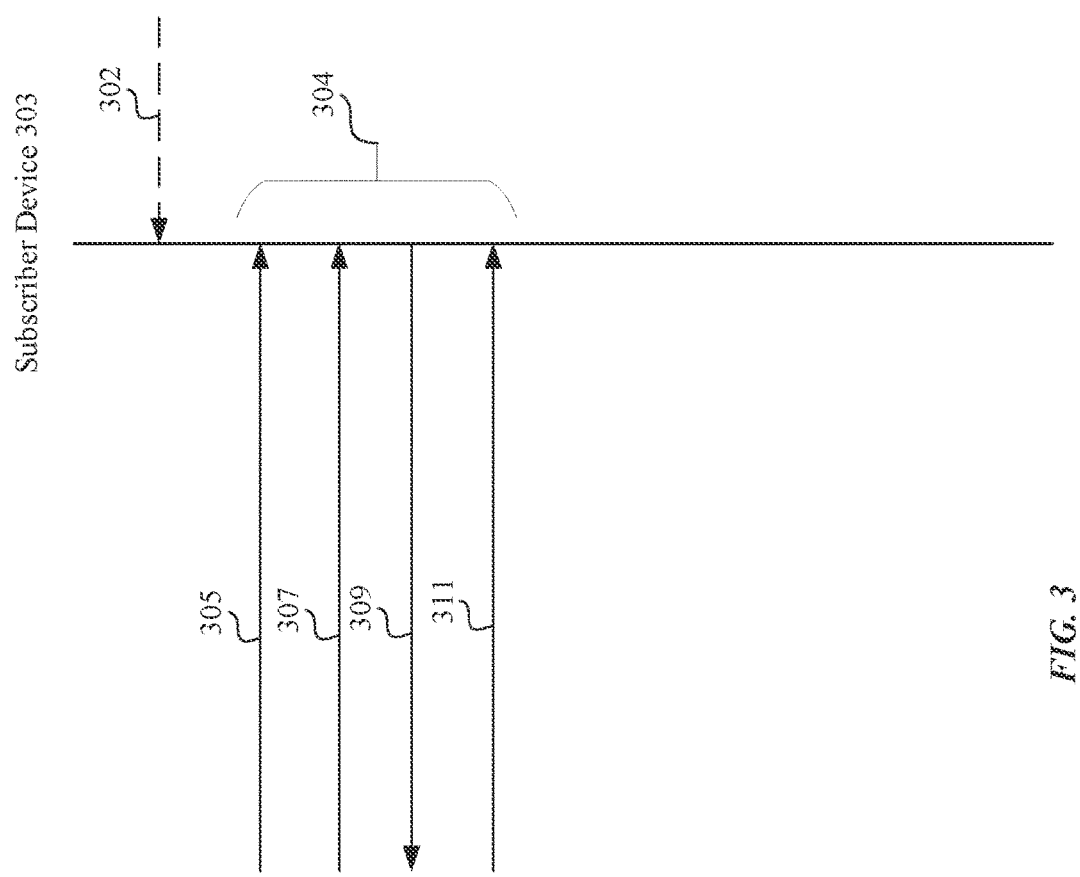
FIG. 3 illustrates an example operation of a subscriber device during the discover procedure, according to some aspects of the disclosure.

FIG. 3 illustrates an example of operation 300 of a subscriber device during the discovery procedure, according to some aspects of the disclosure. The subscriber device 303 (e.g., device 120b of FIG. 1, device 120d of FIG. 1) can, optionally, receive a discovery trigger signal 302. In some examples, the discovery trigger signal 302 can trigger the discovery procedure from the subscriber device 303. For example, when a device that is to be set up (e.g., a publisher device (not shown)) is brought into proximity of the subscriber device 303, the subscriber device 303 is triggered (e.g., by a user opening or initiating an application on the subscriber device 303) to initiate the discovery procedure. In some implementations, the discovery signal 302 can be optional and the discovery procedure can be running in the background in the operating system at the subscriber device 303.

In some examples, after receiving the discovery trigger signal 302, the subscriber device 303 can initiate the discovery procedure. According to some examples, the discovery procedure can include one or more single channel subscribe phases 304. Subscriber device 303 can recursively repeat the single channel publish phase 304.

As discussed above, the duration of each single channel subscribe phase 304 can be implementation dependent. Also, how often the subscriber device 303 repeats the single channel subscribe phase 304 until the discovery procedure is terminated can be implementation dependent. According to some examples, the subscriber device 303 can determine a time period for the single channel subscribe phase 304 at the beginning of the discovery procedure and/or before each instance of the single channel subscribe phase 304. Subscriber device 303 can determine the time period based at least on, for example, other operations (and their timings) that subscriber device's 303 transceiver is performing. In some examples, the subscriber device 303 can use different time periods for different single channel subscribe phases 304. Additionally, or alternatively, the subscriber device 303 can use the same time period for one or more of single channel subscribe phases 304.

Additionally, the subscriber device 303 can further determine a channel for a single channel subscribe phase 304. According to some examples, the channel for a single channel subscribe phase 304 that the subscriber device 303 selects can be chosen by implementation at the beginning of the discovery procedure and can remain the same until the discovery procedure is terminated. According to some aspects, the channel can be chosen from the publish channel list, as discussed above. Additionally, or alternatively, the channel for single channel subscribe phase 304 can be the default publish channel of the single channel publish phase.

According to some aspects, a subscriber device that is capable of tuning its transceiver (e.g., a WLAN transceiver such as a Wi-Fi™ radio) to the default publish channel without disruption to its transceiver's operation can use the default publish channel for the single channel subscribe phase 304. In some examples, a subscriber device (e.g., an AP) that is unable to tune its transceiver to the default publish channel because of a WLAN connectivity operation on another channel, can use its operating channel for single channel subscribe phase 304.

During the single channel subscribe phase 304, the subscriber device 303 can actively transmit one or more frames 309 for discovery. Additionally, or alternatively, during the single channel subscribe phase 304, the subscriber device 303 can listen for one or more frames 305, 307, and 311 from a publisher device (not shown). According to some examples, one or more of frames 305, 307, and 311 can include one or more broadcast or unicast NAN SDF publish frames (e.g., similar to one or more frames 205, 207, and 211 of FIG. 2). Additionally, or alternatively, the one or more frame(s) 309 can include one or more NSN SDF subscribe frames (e.g., similar to frame(s) 209 of FIG. 2).

If the time period for the single channel subscribe phase 304 has ended, but the discovery procedure is not terminated (e.g., a termination time has not ended), the subscriber device 303 can transition back to the single channel subscribe phase 304, according to some aspects. In other words, the subscriber device 303 can perform the discovery procedure (including single channel subscribe phase(s) 304) until the termination condition is satisfied. According to some aspects and as discussed above, the termination condition can include the time for the discovery procedure exceeding the termination time (e.g., a time out). Additionally, or alternatively, the termination condition can include commencement of exchange of service specific messages between the subscriber device 303 and a publisher device (not shown). For example, after discovering the publisher of interest, the subscriber device 303 can initiate an exchange of service specific messages with the publisher device (not shown). The service specific messages can be carried in the NAN SDF follow-up frame, according to some aspects. The commencement of exchange of service specific messages can terminate the discovery procedure.

Table 1 below provides exemplary values for a default publish channel, publish channel list, minimum dwell multiplier, maximum dwell multiplier, minimum time interval between two NAN SDF frames, and termination time (e.g., a time out). It is noted that these values are provided as examples and the aspects of this disclosure are not limited to these examples, but rather can include one or more other values.

TABLE 1

Configuration Parameters

| Name | Value |
| --- | --- |
| default publish channel (aDefaultPublishChannel) | Channel 6 in the 2.4 GHz band |
| publish channel list (aPublishChannelList) | Channel 1 through 13 in the 2.4 GHz band or Channels in the 5 GHz band |
| minimum dwell multiplier (aMinDwellMultiplier) | 4 |
| maximum dwell multiplier (aMaxDwellMultiplier) | 10 |
| minimum time interval between two NAN SDF (aMinSDFInterval) | Variable |
| termination time (e.g., a time out) (aEnhancedDiscoveryTimeout) | a value between [3 min, 15 min] |

As discussed above, the time period of the single channel publish phase can be N*100 TU (time unit), where N is a random integer within a range between a minimum value (minimum dwell multiplier) and a maximum value (maximum dwell multiplier). Similarly, the time period of the single channel subscribe phase can be M*100 TU (time unit), where M is a random integer within a range between a minimum value (minimum dwell multiplier) and a maximum value (maximum dwell multiplier).

Although channels in the 2.4 GHz band are provided in Table 1, the configuration parameters of the discovery procedure can include other channels and/or other frequency bands.

According to some aspects, during the discovery procedure, the transceiver of the subscriber device can perform two or more functions concurrently (e.g., WLAN connectivity and single channel subscribe phase). The subscriber device may indicate to the WLAN AP its unavailability time period for WLAN connectivity and use this time period for performing the single channel subscribe phase. One exemplary value of a maximum unavailability time period for WLAN connectivity on the subscriber device can be about 300 ms. This can be based on an AP's implementation of a DTIM (Delivery Traffic Indication Message) period, e.g., of about 300 ms. For example, in each DTIM period, following the beacon frame, the AP can transmit buffered broadcast and/or multicast data, if any exits. Therefore, the subscriber devices can be available on a WLAN at least every DTIM period in order to not miss the buffered broadcast and/or multicast data.

In some examples, the publisher device can have a minimum dwell period (time period) in each single channel publish phase and each multi-channel publish phase, the minimum dwell period being greater than or equal to the DTIM period (e.g., about 300 ms). In some examples, the publisher device can have a maximum dwell period in each single channel publish phase and each multi-channel publish phase that is a multiple of the DTIM period (e.g., about 3.33×300 ms). In such examples, the dwell period in each single channel publish phase and each multi-channel publish phase can be randomly chosen, e.g., from the time periods including 400 ms, 500 ms, 600 ms, 700 ms, 800 ms, 900 ms, and 1000 ms. However, the aspects of this disclosure are not limited to these examples and other values can be used for the time periods of the single channel publish phase and/or the multi-channel publish phase.

Figure 4:
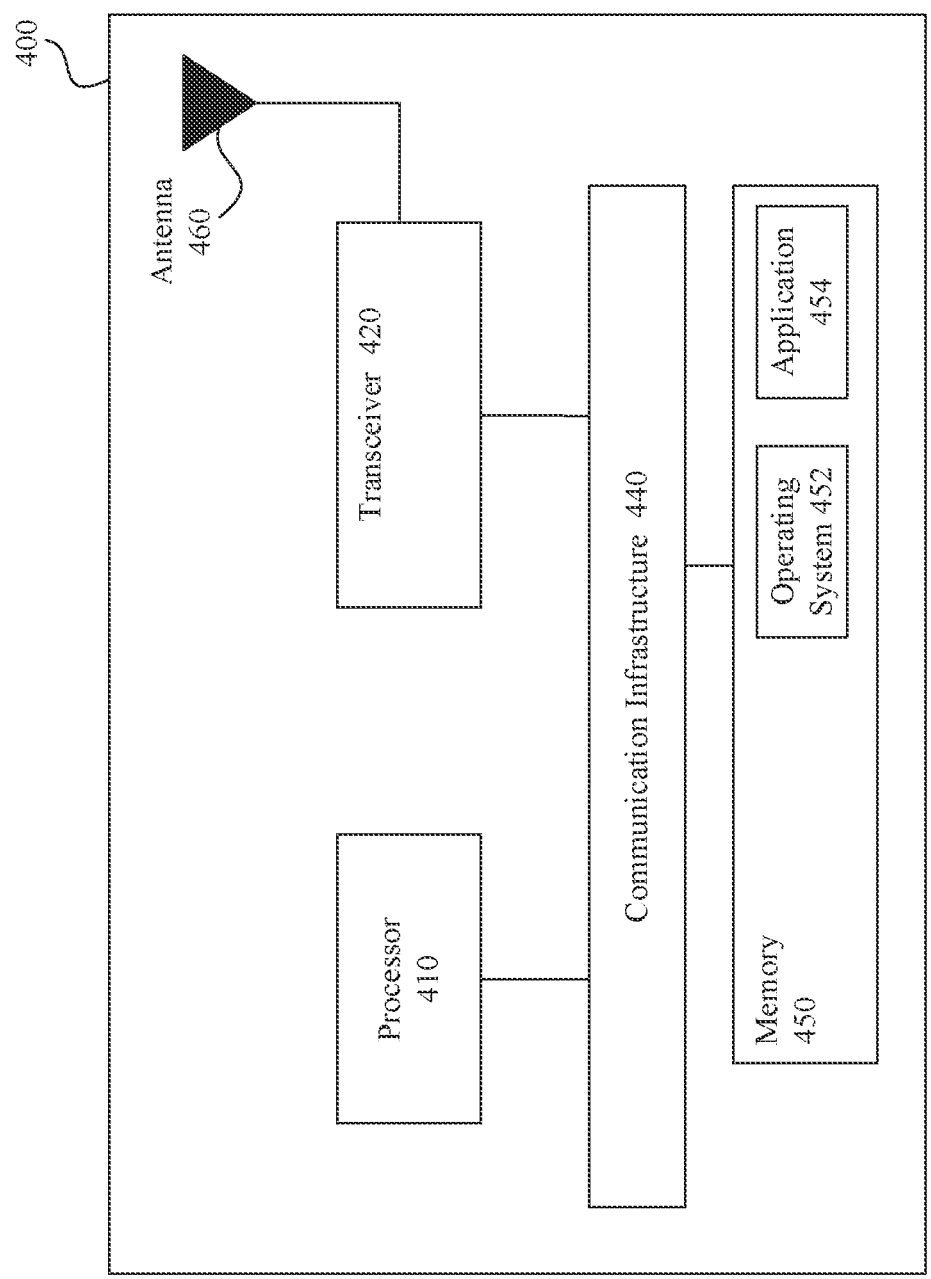
FIG. 4 illustrates a block diagram of an example wireless system of an electronic device implementing a discovery procedure including one or more of single channel publish phases, multi-channel publish phases, and single channel subscribe phases, according to some aspects of the disclosure.

FIG. 4 illustrates a block diagram of an example wireless system 400 of an electronic device implementing a discovery procedure including one or more of single channel publish phases, multi-channel publish phases, and single channel subscribe phases, according to some aspects of the disclosure. System 400 may be any of the electronic devices 120 of system 100, electronic device 201 of FIG. 2, or electronic device 303 of FIG. 3. System 400 includes at least a processor 410, a transceiver 420, a communication infrastructure 440, a memory 450, an operating system 452, an application 454, and an antenna 460. Illustrated systems are provided as exemplary parts of wireless system 400, and system 400 can include other circuit(s) and subsystem(s). Also, although the systems of wireless system 400 are illustrated as separate components, the aspects of this disclosure can include any combination of these, fewer, more, and/or different components.

Memory 450 may include random access memory (RAM) and/or cache, and may include control logic (e.g., computer software) and/or data. Memory 450 may include other storage devices or memory such as, but not limited to, a hard disk drive and/or a removable storage device/unit. According to some examples, operating system 452 can be stored in memory 450. Operating system 452 can manage transfer of data from memory 450 and/or one or more applications 454 to processor 410 and/or transceiver 420. In some examples, operating system 452 maintains one or more network protocol stacks (e.g., Internet protocol stack, cellular protocol stack, and the like) that can include a number of logical layers. At corresponding layers of the protocol stack, operating system 452 includes control mechanism and data structures to perform the functions associated with that layer.

According to some examples, application 454 can be stored in memory 450. Application 454 can include applications (e.g., user applications) used by wireless system 400 and/or a user of wireless system 400. The applications in application 454 can include applications such as, but not limited to, Siri™, FaceTime™, audio streaming, video streaming, remote control, and/or other user applications.

Alternatively or in addition to the operating system, system 400 can include communication infrastructure 440. Communication infrastructure 440 provides communication between, for example, processor 410, transceiver 420, and memory 450. In some implementations, communication infrastructure 440 may be a bus. Processor 410 together with instructions stored in memory 450 perform operations enabling wireless system 400 of system 100 to implement the discovery procedure as described herein.

Transceiver 420 transmits and receives communications signals that support the discovery procedure, according to some aspects, and may be coupled to antenna 460. Antenna 460 may include one or more antennas that may be the same or different types. Transceiver 420 allows system 400 to communicate with other devices that may be wired and/or wireless. Transceiver 420 can include processors, controllers, radios, sockets, plugs, buffers, and like circuits/devices used for connecting to and communication on networks. According to some examples, transceiver 420 includes one or more circuits to connect to and communicate on wired and/or wireless networks. Transceiver 420 can include a cellular subsystem, a WLAN subsystem, and/or a Bluetooth™ subsystem, each including its own radio transceiver and protocol(s) as will be understood by those skilled arts based on the discussion provided herein. In some implementations, transceiver 420 can include more or fewer systems for communicating with other devices.

Cellular subsystem (not shown) can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. Bluetooth™ subsystem (not shown) can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. WLAN subsystem (not shown) can include one or more circuits (including a WLAN transceiver) to enable connection(s) and communication over WLAN networks such as, but not limited to, networks based on standards described in IEEE 802.11 (such as, but not limited to, IEEE 802.11ac, IEEE 802.11ax, IEEE 802.11bc, IEEE 802.11bd, IEEE 802.11be, Wi-Fi™ Alliance Wi-Fi Aware™ specification, IEEE 802.11 Public Action Frame, etc.).

According to some aspects transceiver 420 can be configured to operate at different frequency bands and/or different channels of a frequency bands. Additionally, or alternatively, transceiver 420 can include one or more transceivers configured to operate at different frequency bands and/or different channels of a frequency bands.

According to some aspects, processor 410, alone or in combination with memory 450, and/or transceiver 420, implements the discovery procedure. For example, processor 410, alone or in combination with transceiver 420 and/or memory 405 can perform operations based on single channel publish phase, multi-channel publish phase, and/or single channel subscribe phase as discussed with respect to FIGS. 1, 2, and/or 3. For example, processor 410, alone or in combination with transceiver 420 and/or memory 405 can be configured to control transceiver 420 to operate at different frequency bands and/or different channels of a frequency bands. Additionally or alternatively, processor 410, alone or in combination with transceiver 420 and/or memory 405 can perform method as discussed with respect to FIGS. 6A, 6B, 7A, and 7B.

Figure 5A:
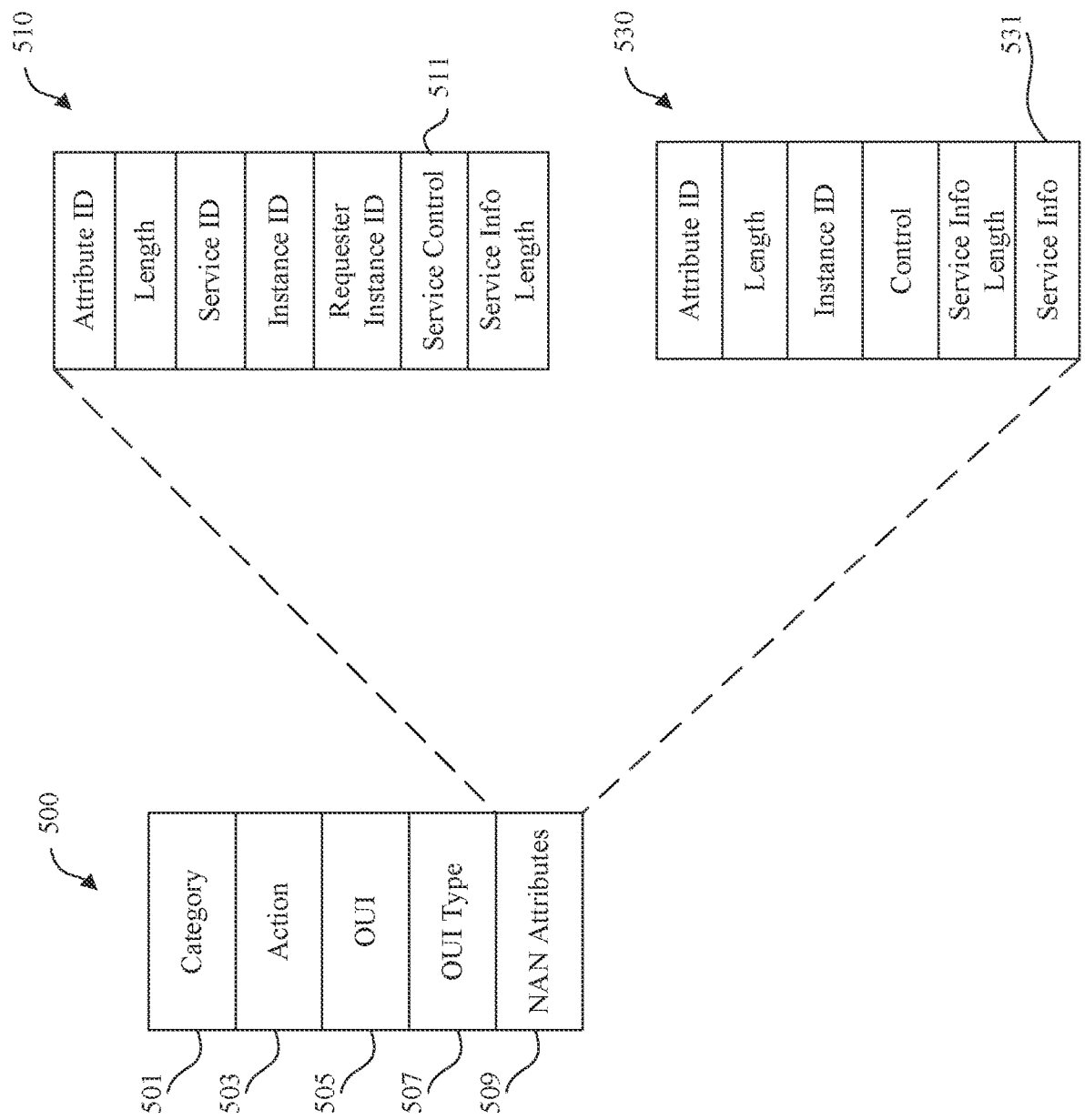

FIG. 5A illustrates an exemplary frame format for a NAN SDF 500, according to some aspects of the disclosure. The NAN SDF 500 can include a category field 501 that can indicate whether the NAN SDF 500 is an IEEE 802.11 Public Action frame or a Protected Dual of Public Action frame. The NAN SDF 500 can also include action field 503 indicating an IEEE 802.11 Public Action frame Vendor Specific. NAN SDF 500 can also include an organizationally unique identifier (OUI) 505 and OUI Type 507 (that identifies the type and version of a NAN information element (IE)). The NAN SDF 500 can also include one or more NAN attributes 509, including one or more SD(E)A (service descriptor extension attribute or service descriptor attribute) NAN attributes.

According to some aspects, NAN attributes 509 can always be present in NAN SDF 500. The SDA format 510 and SDEA format 530 are further shown in FIG. 5A. According to some examples, the SDA format 510 can include an attribute ID field indicating a service descriptor attribute. The SDA format 510 can also include a length field indicating the length of the following fields in the attribute. The SDA format 510 can also include a service ID field including a hash. The SDA format 510 can also include an instance ID field indicating a publish ID or a subscribe ID. The SDA format 510 can also include a requested instance ID field indicating an instance ID from the frame that triggered the transmission, if available (otherwise set to 0). The SDA format 510 can also include a service control field 511 defining a service control bitmap, as discussed with respect to FIG. 5B. Further, the SDA format 510 can also include a service info length field indicating the length of the service info field.

According to some examples, the SDEA format 530 can include an attribute ID field indicating a service descriptor extension attribute. The SDEA format 530 can also include a length field indicating the length of the following fields in the attribute. The SDEA format 530 can also include an instance ID field indicating the same value as the instance ID field of the associated SDA 510. The SDEA format 530 can also include a control field, where a first bit (e.g., the least significant bit) of the control field can be set to 1 indicating further discovery is required for this service. The SDEA format 530 can also include a service info length, indicating the length of the service info field 531. The SDEA format 530 can also include the service info field 531, containing the service specific information in a format discussed with respect to FIG. 5C.

According to some aspects, during the discovery procedure, the service specific information is carried in the service info field 531 of the SDEA 530 in the NAN SDF publish frame sent by the publisher device. In some examples, the service info field 531 of the SDEA 530 in the NAN SDF subscribe frame sent by the subscriber device will be empty or null.

According to some aspects, in a post discovery procedure, the service specific messages are carried in the service info field 531 of the SDEA 530 in a NAN SDF Follow-up frame. In this example, the SDA 510 does not carry a service specific info field.

According to some examples, the service control field 511 can include multiple bits, such as, 8 bits. As illustrated in FIG. 5B, the first two bits of the service control field 511 can indicate whether the NAN SDF 500 is a publish, subscribe, or follow-up frame. For example, a first value (e.g., "00") can indicate that the NAN SDF 500 is a publish frame. A second value (e.g., "01") can indicate that the NAN SDF 500 is a subscribe frame. A third value (e.g., "10") can indicate that the NAN SDF 500 is a follow-up frame. A fourth value (e.g., "11") can be reserved.

A third bit of the service control field 511 can indicate whether a matching filter is present and, in some examples, can be set to value "0". A fourth bit of the service control field 511 can indicate whether a service response filter is present and, in some examples, can be set to value "0". A fifth bit of the service control field 511 can indicate whether service information ("service info") is present and, in some examples, if set to value "0", can indicate that no service info field is found in the SDA 510. A sixth bit of the service control field 511 can indicate that discovery range is limited and, in some examples, can be set to value "0". A seventh bit of the service control field 511 can indicate a binding bitmap and, in some examples, can be set to value "0". An eighth bit of the service control field 511 can be reserved and, in some examples, can be set to value "0". In other implementations, more or fewer bits can be included in the service control field 511, the order of two or more bits can be changed, and/or one or more bits can be used to provide a different indication.

According to some examples, the format of the service info field 531 is illustrated in FIG. 5C. The service info field 531 can include an OUI field, a service protocol type field, and a service specific info field. The service specific info field can include one or more setup messages. The service protocol type field can indicate a generic service protocol type. In some examples, the service protocol type field can be set to a first value (e.g., "0") to indicate that the field is reserved. The service protocol type field can be set to a second value (e.g., "1") to indicate a protocol, such as Bonjour. The service protocol type field can be set to a second value (e.g., "2") to indicate a generic protocol. Further, values 3-255 of the service protocol type field can be reserved. Any number of protocols can be indicated by the service protocol type field and the number of bits associated with the field can vary.

Figure 6A:
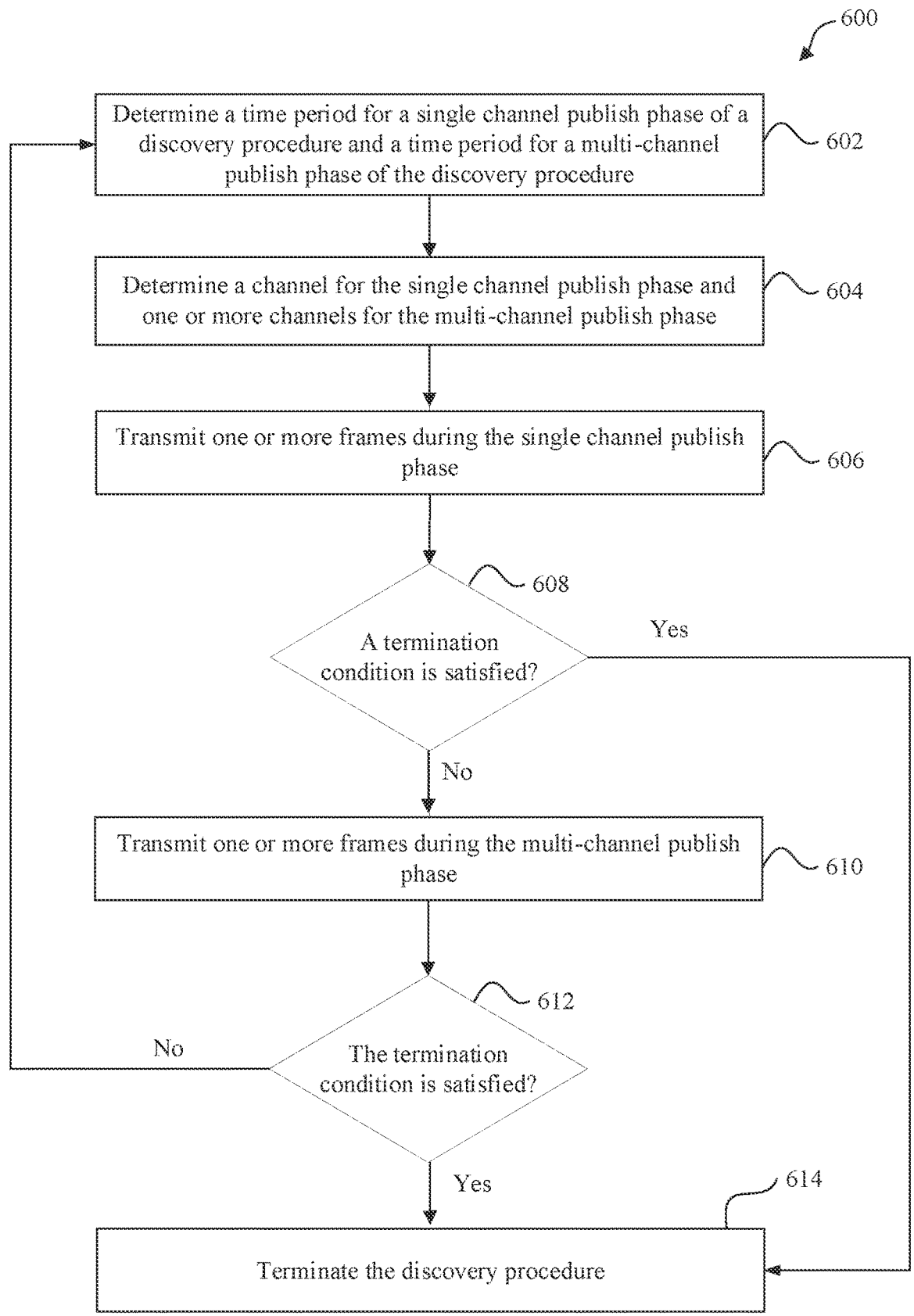
FIGS. 6A and 6B illustrate an example method for a wireless system implementing a discovery procedure including one or more of single channel publish phases and multi-channel publish phases, according to some aspects of the disclosure.

FIG. 6A illustrates an example method 600 for a wireless system implementing a discovery procedure including one or more of single channel publish phases and multi-channel publish phases, according to some aspects of the disclosure. As a convenience and not a limitation, FIG. 6A may be described with regard to elements of FIGS. 1-5. Method 600 may represent the operation of a publisher device (for example, electronic device 120 of FIG. 1 or publisher device 201 of FIG. 2) implementing a discovery procedure. Method 600 may also be performed by system 400 of FIG. 4 and/or computer system 800 of FIG. 8. But, method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6A.

At 602, a time period for a single channel publish phase of the discovery procedure and a time period for a multi-channel publish phase of the discovery procedure is determined. For example, the publisher device determines the time period for the single channel publish phase and the time period for the multi-channel publish phase. According to some aspects, the publisher device determines the time periods at the beginning (e.g., initiation) of the discovery procedure. Additionally, or alternatively, the publisher device can determine the time periods before each corresponding (single channel or multi-channel) publish phase. As discussed above, the publisher device can be configured to determine the time periods randomly or pseudo-randomly from a range of time periods.

In some examples, the time period for each publish phase can be the same. Alternatively, the time periods for different publish phases can differ, e.g., one publish phase can be longer or shorter than another publish phase.

According to some aspects, the discovery procedure can be initiated by the publisher device receiving a discovery trigger signal. In such examples, before operation 602, the publisher device can receive the discovery trigger signal.

At 604, a channel for the single channel publish phase and one or more channels for the multi-channel phase are determined. For example, the publisher device can determine (e.g., select) a channel to use during the single channel publish phase. Also, the publisher device can determine (e.g., select) one or more channels to use during the multi-channel publish phase. In some examples, the channel for the single channel publish phase can be a default channel. Also, the one or more channels for the multi-channel publish phase can be selected from a publish channel list.

According to some aspects, the publisher device determines the channels (e.g., the channel for the single channel publish phase and/or the one or more channels for the multi-channel phase) at the beginning (e.g., initiation) of the discovery procedure. Additionally, or alternatively, the publisher device can determine the channels before each corresponding (single channel or multi-channel) publish phase.

After determining the time periods and the channels, the publisher device can perform the discovery procedure recursively between the single channel publish phase and the multi-channel publish phase. For example, at 606, one or more frames are transmitted during the single channel publish phase. For example, as discussed with respect to FIG. 2, the publisher device can transmit one or more frames during the determined time period of the single channel publish phase, using the determined channel of the single channel publish phase. According to some aspects, the one or more frames can include one or more Neighbor Awareness Networking Service Discovery Frames (NAN SDF). For example, the one or more frames can include one or more broadcast NAN SDFs. In some examples, the one or more frames can include one or more broadcast NAN SDF publish frames.

At 608, the publisher device determines whether a termination condition is satisfied. According to some aspects, the termination condition can correspond to the time for the discovery procedure exceeding a termination time (e.g., a time out). Additionally, or alternatively, the termination condition can include commencement of exchange of service specific messages between a subscriber device and the publisher device. According to some examples, the service specific messages can include setup messages (e.g., messages for setting up the publisher device and/or for setting a connection between the publisher device and the subscriber device). If the termination condition is satisfied, method 600 advances to 614, at which the discovery procedure is terminated.

If the termination condition is not satisfied and the time period for the single channel publish phase has ended, method 600 advances to 610, at which one or more frames are transmitted during the multi-channel publish phase. For example, as discussed with respect to FIG. 2, the publisher device can transmit one or more frames during the determined time period of the multi-channel publish phase, using the determined one or more channels of the multi-channel publish phase. According to some aspects, the one or more frames can include one or more Neighbor Awareness Networking Service Discovery Frames (NAN SDF). For example, the one or more frames can include one or more broadcast NAN SDFs. In some examples, the one or more frames can include one or more broadcast NAN SDF publish frames.

At 612, the publisher device determines whether the termination condition is satisfied. If the termination condition is satisfied, method 600 advances to 614, at which the discovery procedure is terminated. If the termination condition is not satisfied and the time period for the multi-channel publish phase has ended, method 600 advances to 602, where the publisher device can iterate between the single channel publish phase and the multi-channel publish phase until the termination condition is satisfied.

Figure 6B:
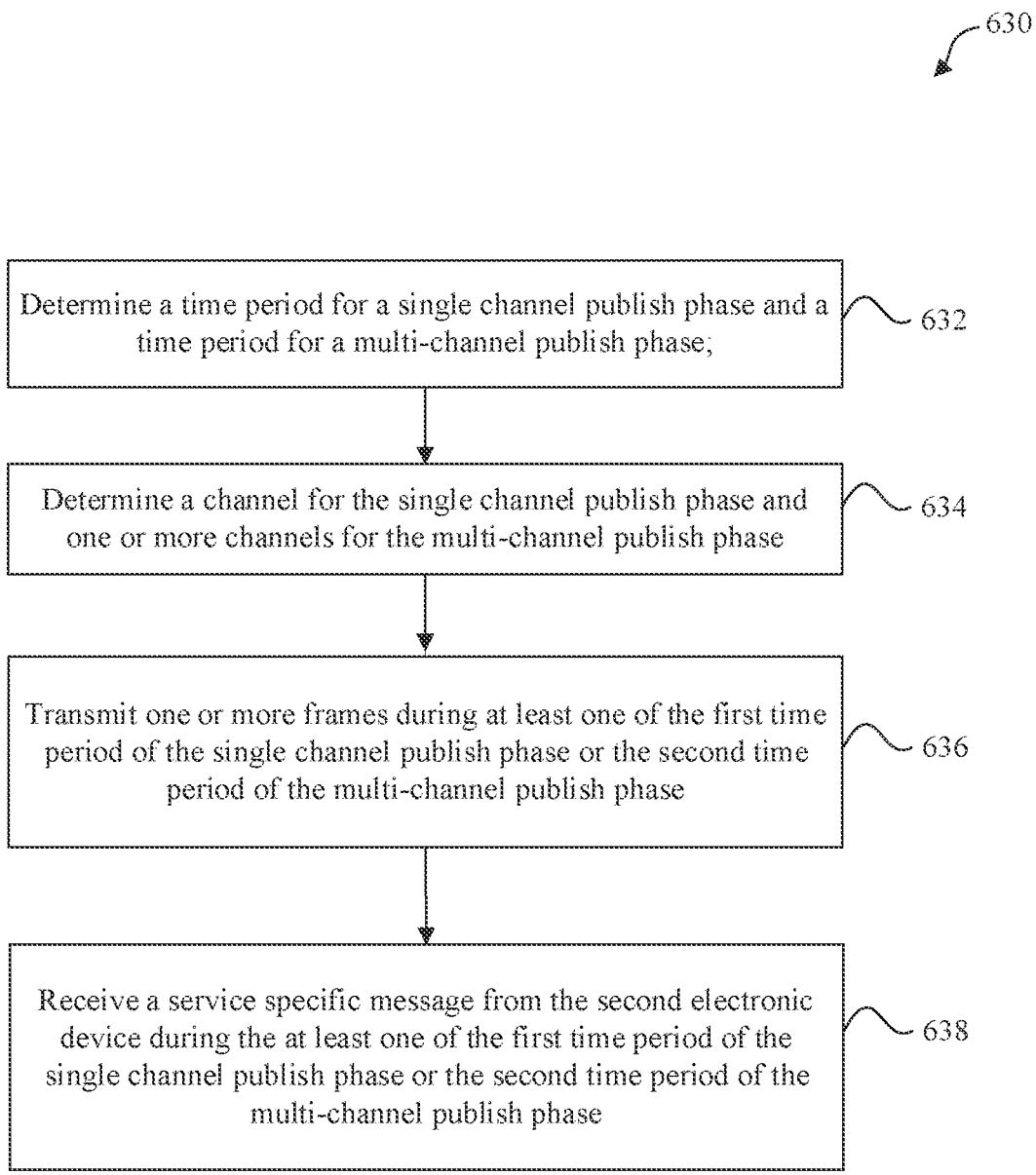

FIG. 6B illustrates an example method 630 for a wireless system implementing a discovery procedure including one or more of single channel publish phases and multi-channel publish phases, according to some aspects of the disclosure. As a convenience and not a limitation, FIG. 6B may be described with regard to elements of FIGS. 1-5 and 6A. Method 630 may represent the operation of a publisher device (for example, electronic device 120 of FIG. 1 or publisher device 201 of FIG. 2) implementing the discovery procedure. Method 630 may also be performed by system 400 of FIG. 4 and/or computer system 800 of FIG. 8. But method 630 is not limited to the specific aspects depicted in those figures and other systems may be used to perform the method as will be understood by those skilled in the art. It is to be appreciated that not all operations may be needed, and the operations may not be performed in the same order as shown in FIG. 6B.

Method 630 provides an exemplary implementation of method 600. Operation 632 of method 630 is similar to operation 602 of method 600. Also, operation 634 of method 630 is similar to operation 604 of method 600. For example, at 632, a time period for a single channel publish phase of the discovery procedure and a time period for a multi-channel publish phase of the discovery procedure is determined. For example, the publisher device determines the time period for the single channel publish phase and the time period for the multi-channel publish phase. According to some aspects, the publisher device determines the time periods at the beginning (e.g., initiation) of the discovery procedure. Additionally, or alternatively, the publisher device can determine the time periods before each corresponding (single channel or multi-channel) publish phase. As discussed above, the publisher device can be configured to determine the time periods randomly or pseudo-randomly from a range of time periods. In some examples, the time period for each publish phase can be the same. Alternatively, the time periods for different publish phases can differ, e.g., one publish phase can be longer or shorter than another publish phase. According to some aspects, the discovery procedure can be initiated by the publisher device receiving a discovery trigger signal. In such examples, before operation 632, the publisher device can receive the discovery trigger signal.

At 634, a channel for the single channel publish phase and one or more channels for the multi-channel phase are determined. For example, the publisher device can determine (e.g., select) a channel to use during the single channel publish phase. Also, the publisher device can determine (e.g., select) one or more channels to use during the multi-channel publish phase. In some examples, the channel for the single channel publish phase can be a default channel. Also, the one or more channels for the multi-channel publish phase can be selected from a publish channel list. According to some aspects, the publisher device determines the channels (e.g., the channel for the single channel publish phase and/or the one or more channels for the multi-channel phase) at the beginning (e.g., initiation) of the discovery procedure. Additionally, or alternatively, the publisher device can determine the channels before each corresponding (single channel or multi-channel) publish phase.

At 636, the publisher devices can transmit one or more frames during at least one of the first time period of the single channel publish phase or the second time period of the multi-channel publish phase. Operation 636 can be similar to one or both of operations 606 and 610 of FIG. 6A.

At 638, the publisher device can receive a service specific message from a second electronic device (e.g., a subscriber device) during the at least one of the first time period of the single channel publish phase or the second time period of the multi-channel publish phase. According to some aspects, receiving the service specific message from the subscriber device can result in the publisher device determining that the termination condition is satisfied (e.g., operations 608 or 612 of FIG. 6A) and therefore, the publisher device can terminate the discovery procedure.

According to some aspects, operation 636 can be performed over one or more single channel publish phases and one or more multi-channel publish phases until the termination condition is satisfied. For example, the publisher device can transmit a first set of frames during the first time period of the single channel publish phase and transmit a second set of frames during the second time period of the multi-channel publish phase. If the termination condition is not satisfied, the publisher device can then determine a third time period for the single channel publish phase and a fourth time period for the multi-channel publish phase, transmit a third set of frames during the third time period of the single channel publish phase, and transmit a fourth set of frames during the fourth time period of the multi-channel publish phase.

Figure 7A:
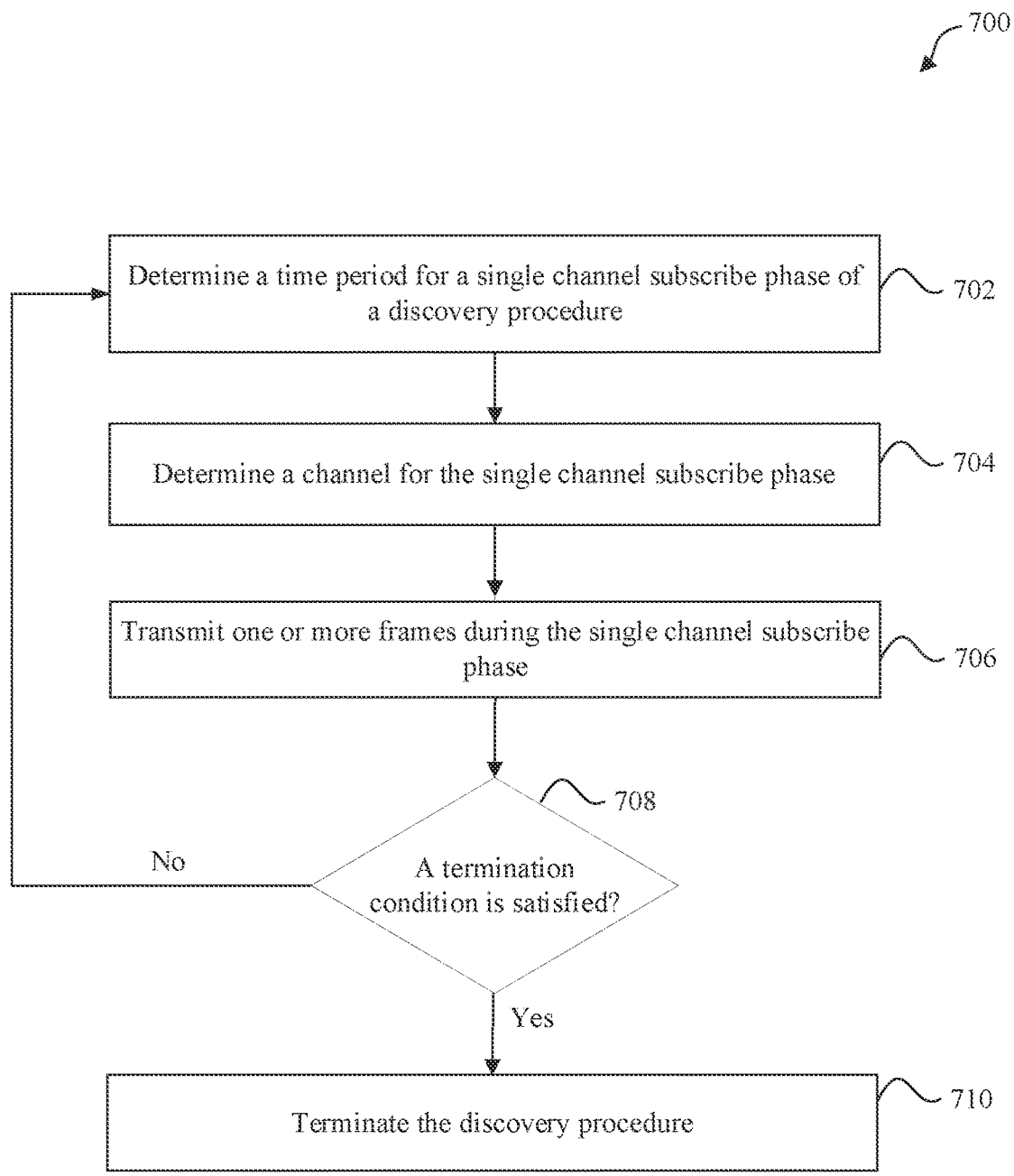
FIGS. 7A and 7B illustrate an example method for a wireless system implementing a discovery procedure including one or more of single channel subscribe phases, according to some aspects of the disclosure.

FIG. 7A illustrates an example method 700 for a wireless system implementing a discovery procedure including one or more of single channel subscribe phases, according to some aspects of the disclosure. As a convenience and not a limitation, FIG. 7A may be described with regard to elements of FIGS. 1-6. Method 700 may represent the operation of a subscriber device (for example, electronic device 120 of FIG. 1 or subscriber device 303 of FIG. 3) implementing the discovery procedure. Method 700 may also be performed by system 400 of FIG. 4 and/or computer system 800 of FIG. 8. But method 700 is not limited to the specific aspects depicted in those figures and other systems may be used to perform the method as will be understood by those skilled in the art. It is to be appreciated that not all operations may be needed, and the operations may not be performed in the same order as shown in FIG. 7A.

At 702, a time period for the single channel subscribe phase of the discovery procedure is determined. For example, the subscriber device can determine a time period for performing the discovery procedure using the single channel subscribe phase. According to some aspects, the subscriber device can determine the time period based on the other activities and other time commitments of its transceiver. According to some aspects, the subscriber device can determine the time period at the beginning (e.g., initiation) of the discovery procedure. Additionally, or alternatively, the subscriber device can determine the time periods before each corresponding single channel subscriber phase. In some examples, the time period can be determined to be (e.g., set to) unlimited. In other words, the discovery procedure using the single channel subscribe phase can be run as a background process.

According to some aspects, the discovery procedure can be initiated in response to the publisher device receiving a discovery trigger signal. In such examples, before operation 702 (before determining the time periods), the subscriber device can receive the discovery trigger signal.

At 704, a channel for the single channel subscribe phase is determined. For example, the subscriber device can determine (e.g., select) a channel to use during the single channel subscribe phase. In some examples, the channel for the single channel publish phase can be a default channel. Additionally, or alternatively, the subscriber device can determine the channel from a publish channel list. In some examples, the subscriber device uses the channel that the subscriber device is using for its communication with other electronic devices as the channel for the single channel subscribe phase.

After determining the time period(s) and the channel(s), the subscriber device can perform the discovery procedure using one or more single channel subscribe phases. For example, at 706, one or more frames are transmitted during the single channel subscribe phase. For example, as discussed with respect to FIG. 3, the subscriber device can transmit one or more frames during the determined time period of the single channel subscribe phase and using the determined channel of the single channel subscribe phase. According to some aspects, the one or more frames can include one or more Neighbor Awareness Networking Service Discovery Frames (NAN SDF). For example, the one or more frames can include one or more broadcast NAN SDFs. In some examples, the one or more frames can include one or more broadcast NAN SDF subscribe frames.

At 708, the subscriber device determines whether a termination condition is satisfied. According to some aspects, the termination condition can include the time for the discovery procedure exceeding a termination time (e.g., a time out). Additionally, or alternatively, the termination condition can include commencement of an exchange of service specific messages between a subscriber device and the publisher device. If the termination condition is satisfied, method 700 advances to 710, at which the discovery procedure is terminated. If the termination condition is not satisfied and the time period for the single channel subscribe phase has ended, method 700 advances to 702, where the subscriber device can perform the discovery procedure using the single channel subscribe phase.

Figure 7B:
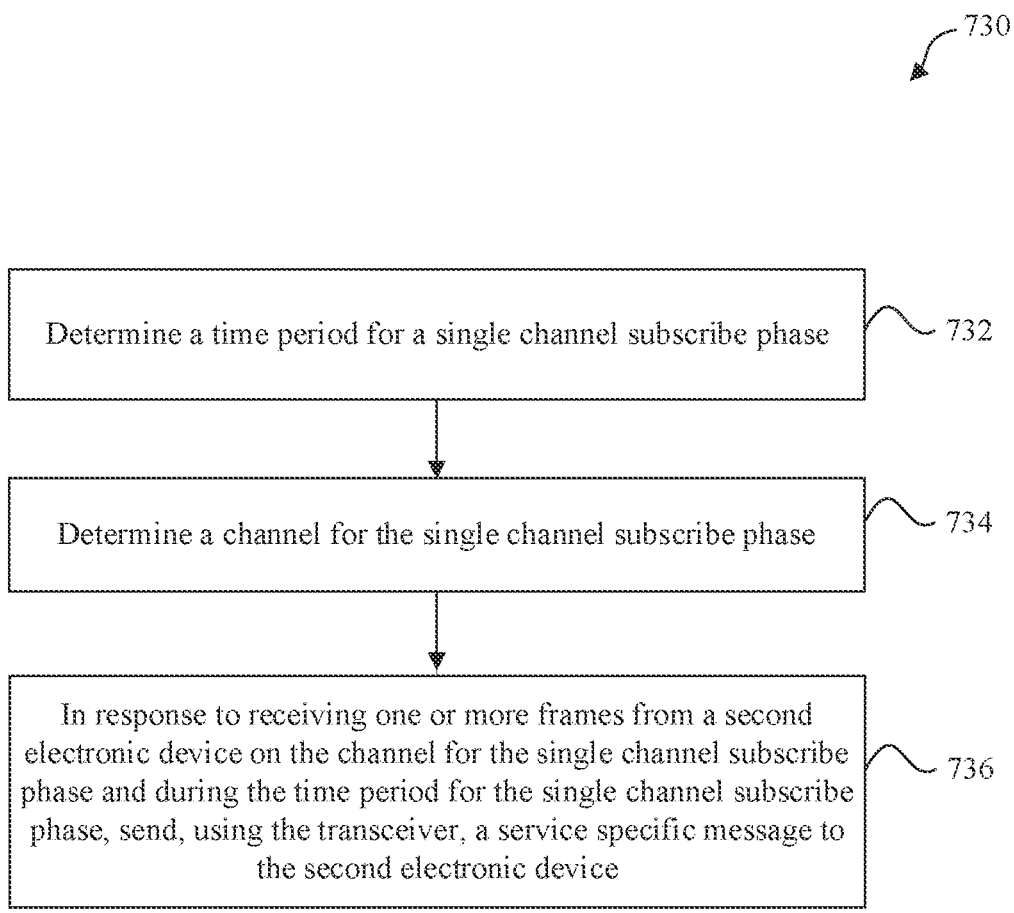

FIG. 7B illustrates an example method 730 for a wireless system implementing a discovery procedure including one or more single channel subscribe phases, according to some aspects of the disclosure. As a convenience and not a limitation, FIG. 7B may be described with regard to elements of FIGS. 1-6 and 7A. Method 730 may represent the operation of a subscriber device (for example, electronic device 120 of FIG. 1 or subscriber device 303 of FIG. 3) implementing the discovery procedure. Method 730 may also be performed by system 400 of FIG. 4 and/or computer system 800 of FIG. 8. But, method 730 is not limited to the specific aspects depicted in those figures and other systems may be used to perform the method as will be understood by those skilled in the art. It is to be appreciated that not all operations may be needed, and the operations may not be performed in the same order as shown in FIG. 7B.

Method 730 provides an exemplary implementation of method 700. Operation 732 of method 730 is similar to operation 702 of method 700. Also, operation 734 of method 730 is similar to operation 704 of method 700. For example, at 732, a time period for the single channel subscribe phase of the discovery procedure is determined. For example, the subscriber device can determine a time period for performing the discovery procedure using the single channel subscribe phase. According to some aspects, the subscriber device can determine the time period based on the other activities and other time commitments of its transceiver. According to some aspects, the subscriber device can determine the time period at the beginning (e.g., initiation) of the discovery procedure. Additionally, or alternatively, the subscriber device can determine the time periods before each corresponding single channel subscriber phase. In some examples, the time period can be determined to be (e.g., set to) unlimited. In other words, the discovery procedure using the single channel subscribe phase can be run as a background process. According to some aspects, the discovery procedure can be initiated in response to the publisher device receiving a discovery trigger signal. In such examples, before operation 732 (before determining the time periods), the subscriber device can receive the discovery trigger signal.

At 734, a channel for the single channel subscribe phase is determined. For example, the subscriber device can determine (e.g., select) a channel to use during the single channel subscribe phase. In some examples, the channel for the single channel publish phase can be a default channel. Additionally, or alternatively, the subscriber device can determine the channel from a publish channel list. In some examples, the subscriber device uses the channel that the subscriber device is using for its communication with other electronic devices as the channel for the single channel subscribe phase.

At 736, in response to receiving one or more frames from a publisher device on the channel for the single channel subscribe phase and during the time period for the single channel subscribe phase, the publisher device can send one or more service specific messages to the subscriber device. According to some aspects, sending the one or more service specific messages to the publisher device can terminate the discovery procedure.

According to some aspects, before operation 736, the subscriber device can determine whether the time period of the single channel subscribe phase has ended. In response to determining that the time period for the single channel subscribe phase has ended, the subscriber device can determine whether a termination time has ended. If the termination time has not ended, the subscriber device can perform another single channel subscribe phase. For example, the subscriber device can determine a second time period for the single channel subscribe phase, determine a second channel for the single channel subscribe phase, and determine whether the one or more frames are received on the second channel during the second time period for the second single channel subscribe phase. In some examples, the first and second channel are the same channel. In some other examples, the first and second channels are different channels.

According to some aspects, in addition to, or alternatively to, listening for frames from the publisher device, the subscribe device can transmit frame(s) for discovering the publisher device. For example, the subscribe device can receive a discovery trigger signal, initiate the discovery procedure, and transmit one or more frames (e.g., broadcast frames) to the publisher device. In some examples, the one or more broadcast frames can include one or more broadcast NAN SDF subscribe frames.

Figure 8:
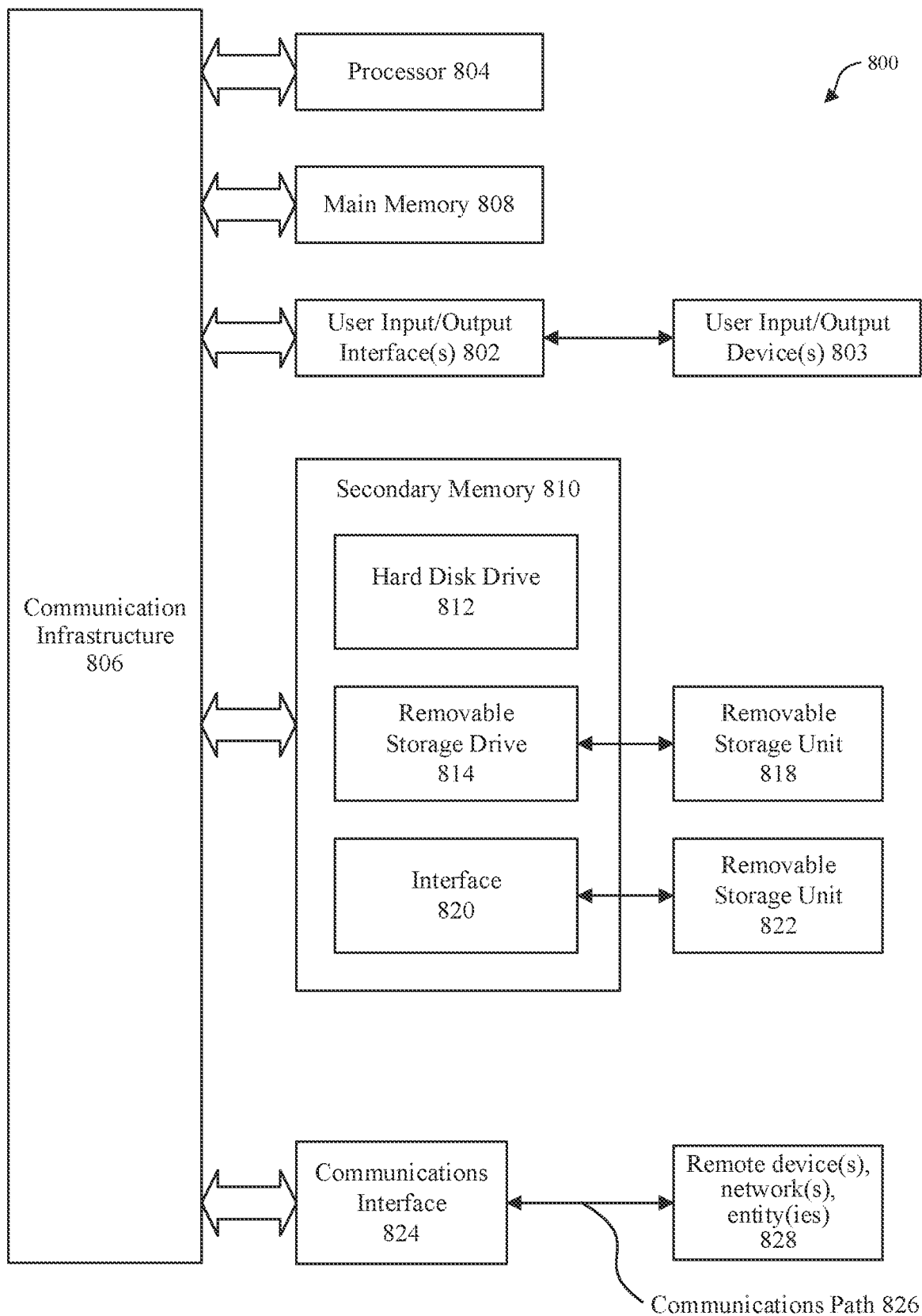
FIG. 8 illustrates an example computer system that can be used for implementing some aspects of the disclosure or portion(s) thereof.

Various aspects can be implemented, for example, using one or more computer systems, such as computer system 800 shown in FIG. 8. Computer system 800 can be any well-known computer capable of performing the functions described herein such as devices 120 of FIG. 1, or system 400 of FIG. 4. Computer system 800 includes one or more processors (also called central processing units, or CPUs), such as a processor 804. Processor 804 is connected to a communication infrastructure 806 (e.g., a bus.) Computer system 800 also includes user input/output device(s) 803, such as monitors, keyboards, pointing devices, etc., that communicate with communication infrastructure 806 through user input/output interface(s) 802. Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to some aspects, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 800, main memory 808, secondary memory 810 and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 8. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "aspects," "one aspect," "one embodiment," "an embodiment," "an example embodiment," or similar phrases, indicate that the embodiment described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. An electronic device, comprising:
a transceiver configured to communicate with a second electronic device; and
a processor communicatively coupled to the transceiver and configured to:
  determine a first time period for a single channel publish phase;
  determine a second time period for a multi-channel publish phase, wherein the multi-channel publish phase is separate from the single channel publish phase and wherein the first time period is different from the second time period;
  transmit, using the transceiver, one or more frames during at least one of the first time period of the single channel publish phase or the second time period of the multi-channel publish phase; and
  receive, using the transceiver, a service specific message from the second electronic device during the at least one of the first time period of the single channel publish phase or the second time period of the multi-channel publish phase.

2. The electronic device of claim 1, wherein the processor is configured to determine the first time period and the second time period, at least pseudo-randomly, from a range of time periods.

3. The electronic device of claim 1, wherein the processor is further configured to:
  transmit, using the transceiver, a first set of frames during the first time period of the single channel publish phase;
  transmit, using the transceiver, a second set of frames during the second time period of the multi-channel publish phase;
  determine a third time period for the single channel publish phase and a fourth time period for the multi-channel publish phase;
  transmit, using the transceiver, a third set of frames during the third time period of the single channel publish phase; and transmit, using the transceiver, a fourth set of frames during the fourth time period of the multi-channel publish phase.

4. The electronic device of claim 1, wherein the processor is configured to transmit the one or more frames over a first channel during the first time period of the single channel publish phase.

5. The electronic device of claim 1, wherein the processor is configured to transmit the one or more frames over a plurality of channels during the second time period of the multi-channel publish phase, wherein the plurality of channels is selected from a list of channels.

6. The electronic device of claim 1, wherein the processor is further configured to:
receive a discovery trigger signal before determining the first time period and the second time period.

7. The electronic device of claim 1, wherein the one or more frames comprise one or more broadcast Neighbor Awareness Networking Service Discovery Frames (NAN SDF).

8. A method, comprising:
determining, by a publisher device, a first time period for a single channel publish phase;
determining, by the publisher device, a second time period for a multi-channel publish phase, wherein the multi-channel publish phase is separate from the single channel publish phase and wherein the first time period is different from the second time period;
transmitting, by the publisher device, one or more frames during at least one of the first time period of the single channel publish phase or the second time period of the multi-channel publish phase; and
receiving, by the publisher device, a service specific message from a subscriber device during the at least one of the first time period of the single channel publish phase or the second time period of the multi-channel publish phase.

9. The method of claim 8, wherein determining the first time period and the second time period comprises determining the first time period and the second time period, at least pseudo-randomly, from a range of time periods.

10. The method of claim 8, further comprising:
transmitting, by the publisher device, a first set of frames during the first time period of the single channel publish phase;
transmitting, by the publisher device, a second set of frames during the second time period of the multi-channel publish phase;
determining a third time period for the single channel publish phase and a fourth time period for the multi-channel publish phase;
transmitting, by the publisher device, a third set of frames during the third time period of the single channel publish phase; and
transmitting, by the publisher device, a fourth set of frames during the fourth time period of the multi-channel publish phase.

11. The method of claim 8, further comprising:
determining a first channel for the single channel publish phase; and
transmitting the one or more frames over the first channel during the first time period of the single channel publish phase.

12. The method of claim 8, further comprising:
determining one or more channels for the multi-channel publish phase from a list of channels; and
transmitting the one or more frames over the one or more channels during the second time period of the multi-channel publish phase.

13. The method of claim 8, further comprising:
receiving a discovery trigger signal before determining the first time period and the second time period.

14. The method of claim 8, wherein the one or more frames comprise one or more broadcast Neighbor Awareness Networking Service Discovery Frames (NAN SDF).

15. An electronic device, comprising:
a memory; and
a processor communicatively coupled to the memory and configured to:
determine a first time period for a single channel publish phase of a discovery procedure;
determine a second time period for a multi-channel publish phase of the discovery procedure, wherein the multi-channel publish phase is separate from the single channel publish phase; and
iterate between the single channel publish phase and the multi-channel publish phase for discovering one or more subscriber devices.

16. The electronic device of claim 15, wherein the processor is configured to determine the first time period and the second time period, at least pseudo-randomly, from a range of time periods and wherein the first time period is different from the second time period.

17. The electronic device of claim 16, wherein the single channel publish phase is associated with a first channel and the multi-channel publish phase is associated with a plurality of channels.

18. The electronic device of claim 17, wherein the processor is further configured to divide the second time period between the plurality of channels of the multi-channel publish phase.

19. The electronic device of claim 15, wherein the processor is further configured to transmit a first set of one or more frames on a first channel during the single channel publish phase and transmit a second set of one or more frames on a plurality of channels during the multi-channel publish phase.

20. The electronic device of claim 15, wherein the processor is further configured to recursively iterate between the single channel publish phase and the multi-channel publish phase until the discovery procedure is terminated.

* * * * *